(12) United States Patent
Lahrman et al.

(10) Patent No.: US 11,916,441 B2
(45) Date of Patent: Feb. 27, 2024

(54) ROTOR FOR AN ELECTRIC MACHINE

(71) Applicant: BorgWarner Inc., Auburn Hills, MI (US)

(72) Inventors: Joshua B. Lahrman, Fishers, IN (US); David A. Fulton, Anderson, IN (US)

(73) Assignee: BORGWARNER INC., Auburn Hills, MI (US)

(*) Notice: Subject to any disclaimer, the term of this patent is extended or adjusted under 35 U.S.C. 154(b) by 272 days.

(21) Appl. No.: 17/160,493

(22) Filed: Jan. 28, 2021

(65) Prior Publication Data

US 2021/0288564 A1 Sep. 16, 2021

Related U.S. Application Data

(60) Provisional application No. 62/990,194, filed on Mar. 16, 2020.

(51) Int. Cl.
| | | |
|---|---|---|
| *H02K 1/28* | (2006.01) | |
| *H02K 1/22* | (2006.01) | |
| *H02K 15/02* | (2006.01) | |
| *H02K 15/14* | (2006.01) | |
| *H02K 7/00* | (2006.01) | |

(52) U.S. Cl.
CPC ............ *H02K 1/28* (2013.01); *H02K 1/22* (2013.01); *H02K 7/003* (2013.01); *H02K 15/02* (2013.01); *H02K 15/14* (2013.01)

(58) Field of Classification Search
CPC .................................. H02K 1/28; H02K 1/30
USPC .......................................................... 29/598
See application file for complete search history.

(56) References Cited

U.S. PATENT DOCUMENTS

| | | | | |
|---|---|---|---|---|
| 2009/0115281 A1* | 5/2009 | Kimura | ............... | H02K 15/028 |
| | | | | 29/598 |
| 2015/0084462 A1* | 3/2015 | Shimomura | ........... | H02K 7/083 |
| | | | | 310/90 |
| 2016/0056677 A1* | 2/2016 | Ikuta | ........................ | H02K 1/28 |
| | | | | 310/216.016 |

FOREIGN PATENT DOCUMENTS

| | | | |
|---|---|---|---|
| CN | 206389197 U | 8/2017 | |
| DE | 102018204692 A1 * | 10/2019 | ............... H02K 1/30 |
| JP | 2002354751 A | 12/2002 | |
| JP | 2005102460 A * | 4/2005 | |
| JP | 2005160140 A | 6/2005 | |
| JP | 2006158005 A | 6/2006 | |
| JP | 2011182488 A | 9/2011 | |

OTHER PUBLICATIONS

International Search Report and Written Opinion for International Application No. PCT/US2021/021459; International Filing Date Mar. 9, 2021; dated Jun. 30, 2021 (pp. 1-9).

* cited by examiner

*Primary Examiner* — Livius R. Cazan
(74) *Attorney, Agent, or Firm* — CANTOR COLBURN LLP

(57) ABSTRACT

A rotor includes a shaft having an outer surface including a first diameter and a flange extending from the outer surface. A first plurality of laminations is arranged about the shaft. The first plurality of laminations includes an outer annular surface and an inner surface defining an opening including a second diameter that is substantially equal to the first diameter. A second plurality of laminations is arranged about the shaft and coupled to the first plurality of laminations. The second plurality of laminations include an outer annular surface portion and an inner surface portion defining a third diameter that is greater than the first diameter.

18 Claims, 9 Drawing Sheets

ROTOR FOR AN ELECTRIC MACHINE

CROSS REFERENCE TO RELATED APPLICATIONS

This application claims the benefit of an earlier filing date from U.S. Provisional Application Ser. No. 62/990,194 filed Mar. 16, 2020, the entire disclosure of which is incorporated herein by reference.

BACKGROUND OF THE INVENTION

Exemplary embodiments pertain to the art of electric machines and, more particularly, to a rotor for an electric machine.

A conventional electric machine includes a rotor having a hub that supports a plurality of laminations. The rotor hub is typically formed from metal such s cast iron, steel and the like. As such, the rotor hub is a primary contributor to rotor weight. Also, the rotor hub requires many fabrication steps. As such, production costs for the rotor hub are a primary contributor to overall rotor cost. Given the weight and costs associated with the rotor hub, manufacturers would welcome a rotor that can be produced without the need for the rotor hub.

BRIEF DESCRIPTION OF THE INVENTION

Disclosed is a rotor including a shaft having an outer surface including a first diameter and a flange extending from the outer surface. A first plurality of laminations is arranged about the shaft. The first plurality of laminations include an outer annular surface and an inner surface defining an opening including a second diameter that is substantially equal to the first diameter. A second plurality of laminations is arranged about the shaft and coupled to the first plurality of laminations. The second plurality of laminations include an outer annular surface portion and an inner surface portion defining a third diameter that is greater than the first diameter.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
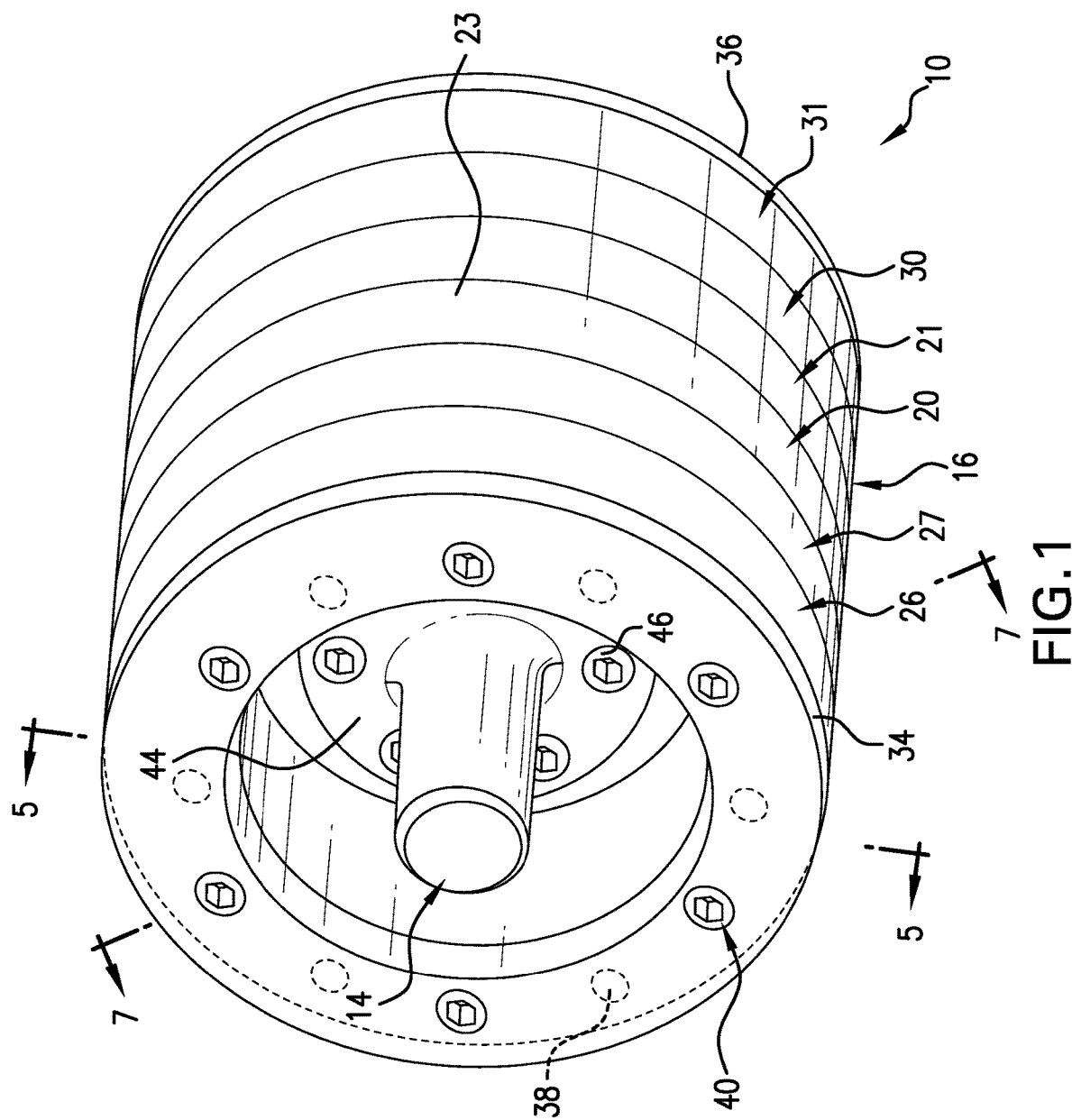
FIG. 1 depicts a perspective view of a rotor, in accordance with an exemplary aspect.
Figure 2:
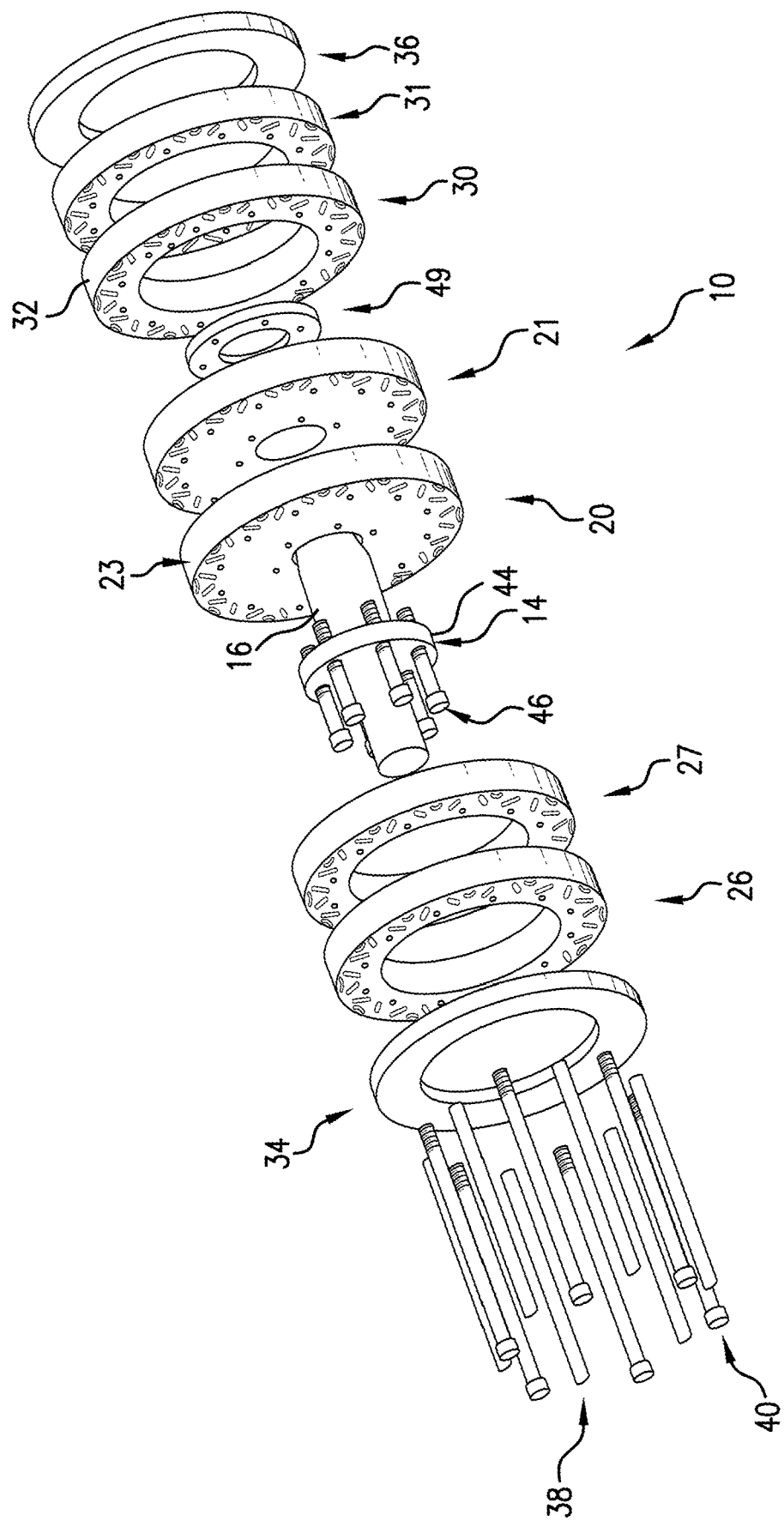
FIG. 2 depicts a disassembled view of the rotor of FIG. 1.

A rotor, in accordance with exemplary embodiments, is generally indicated at 10 in FIGS. 1 and 2. Rotor 10 includes a central shaft 14 having an outer surface 16 having a first diameter (not separately labeled) that supports a first center lamination stack 20 and a second center lamination stack 21. Each central lamination stack 20 and 21 includes a first plurality of laminations indicated generally at 23. Rotor 10 also includes a first outer lamination stack 26 and a second outer lamination stack 27 arranged axially outwardly of first central lamination stack 20. Second outer lamination stack 27 is arranged between first outer lamination stack 26 and first central lamination stack 20. First and second outer lamination stacks 26 and 27 include a second plurality of laminations.

Rotor 10 is further shown to include a third outer lamination stack 30 and a fourth outer lamination stack 31 are arranged axially outwardly of central laminations stack 21 and third outer lamination stack 30. Third and fourth outer lamination stacks 30 and 31 include a third plurality of laminations 32. Third plurality of laminations 32 may be substantially similar to second plurality of laminations 28. Rotor 10 also includes a first end cap 34 mounted to and axially outwardly of first outer lamination stack 26 and a second end cap 36 mounted to and axially outwardly of fourth outer lamination stack 31.

A plurality of alignment pins 38 extends through each of the first outer lamination stack 26, the second outer lamination stack 27, the first central lamination stack 20, the second central lamination stack 21, the third outer lamination stack 26 and the fourth outer lamination stack 27 to establish a selected orientation of each of the first plurality of laminations 23 and the second plurality of laminations 28. In addition, a plurality of fasteners 40 extends through and join each of the first outer lamination stack 26, the second outer lamination stack 27, the first central lamination stack 20, the second central lamination stack 21, the third outer lamination stack 26 and the fourth outer lamination stack 27.

Each of the first plurality of laminations 23 forming the first central lamination stack 20 and/or the second central lamination stack 21 may be joined to one another through one or more of a variety of methods including welding, gluing, stacking and the like. Alternatively, each of the first plurality of laminations 23 forming the first central lamination stack 20 and/or the second central lamination stack 21 may not be bonded to one another.

Similarly, each of the second plurality of laminations that form the first outer lamination stack 26, the second outer lamination stack 27, the third outer lamination stack 26 and the fourth outer lamination stack 27 may be bonded to one another through one or more of a variety of methods including welding, gluing, stacking and the like. Alternatively, each of the second plurality of laminations that form the first outer lamination stack 26, the second outer lamination stack 27, the third outer lamination stack 26 and the fourth outer lamination stack 27 may not be bonded to one another.

At this point, it should be understood that the number and relative position of laminations stacks may vary. It should also be understood that the term "rotor" describes a rotor in which a number of axially aligned laminations are not in contact with nor directly supported by the central shaft 14. That is, shaft 14 includes a radially outwardly extending flange 44 to which each of the first central lamination stack 20 and second central lamination stack 21 are connected through fasteners 46 and a support member 49 as will be detailed herein. The first outer lamination stack 26, the second outer lamination stack 27, the third outer lamination stack 26 and the fourth outer lamination stack 27 do not touch nor are they directly supported by shaft 14.

Figure 3:
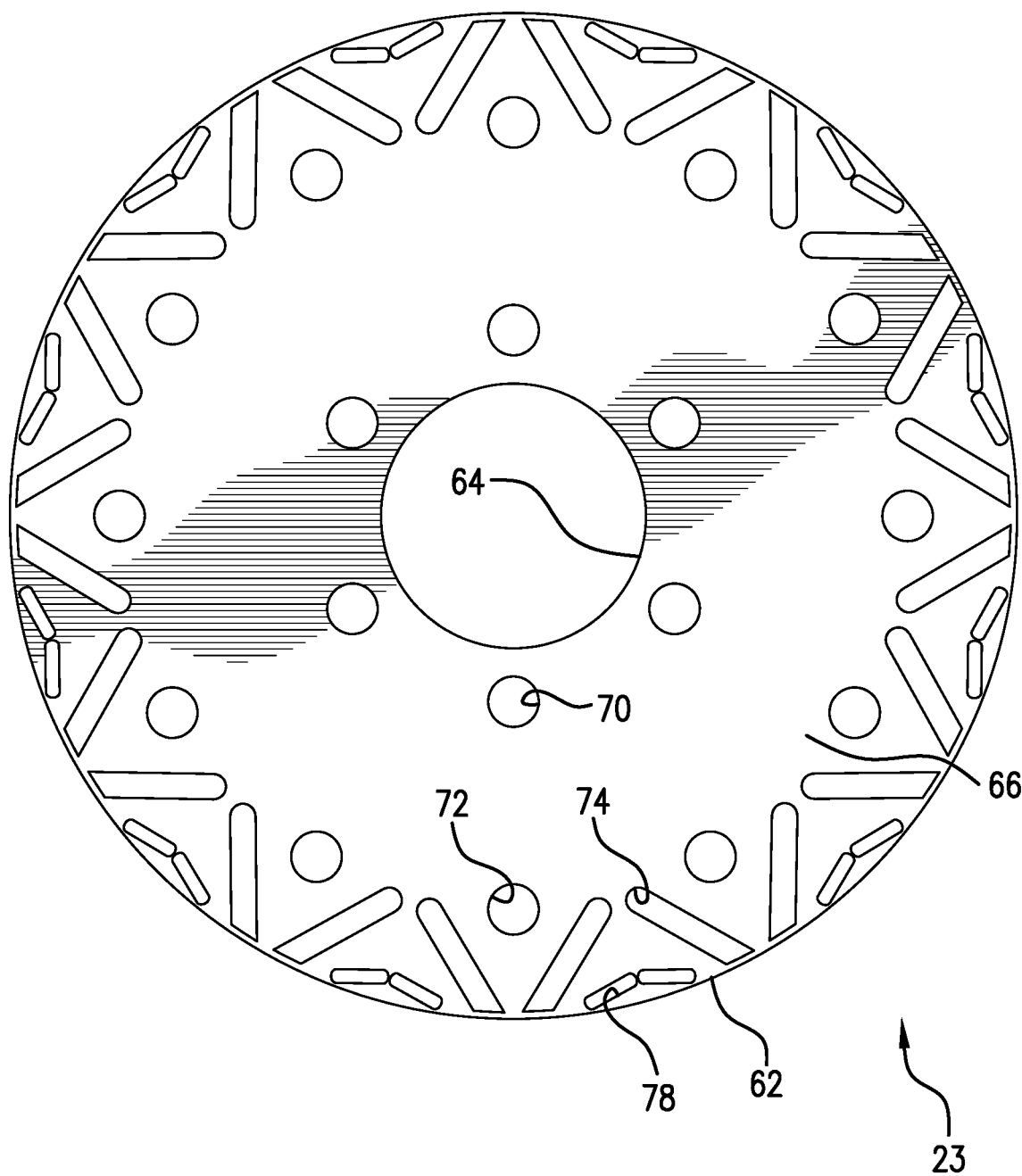
FIG. 3 depicts a plan view of a rotor lamination of the rotor of FIG. 1.

As shown in FIG. 3, each of the first plurality of laminations 23 includes an outer annular surface 62 and an inner surface 64 having a second diameter that is substantially equal to the first diameter. A web 66 extends from outer annular surface 62 to inner surface 64. In an embodiment web 66 includes a substantially continuous central region 68 disposed between outer annular surface 62 and inner surface 64. A plurality of openings 70 that receive corresponding ones of fasteners 46 is arranged between web 66 and inner surface 64. A plurality of openings 72, which receive corresponding ones of fasteners 40, is arranged between openings 70 and outer annular surface 62. In addition, magnet receiving openings 74 and cooling passages 78 are arranged in web 66 adjacent outer annular surface 62.

Figure 4:
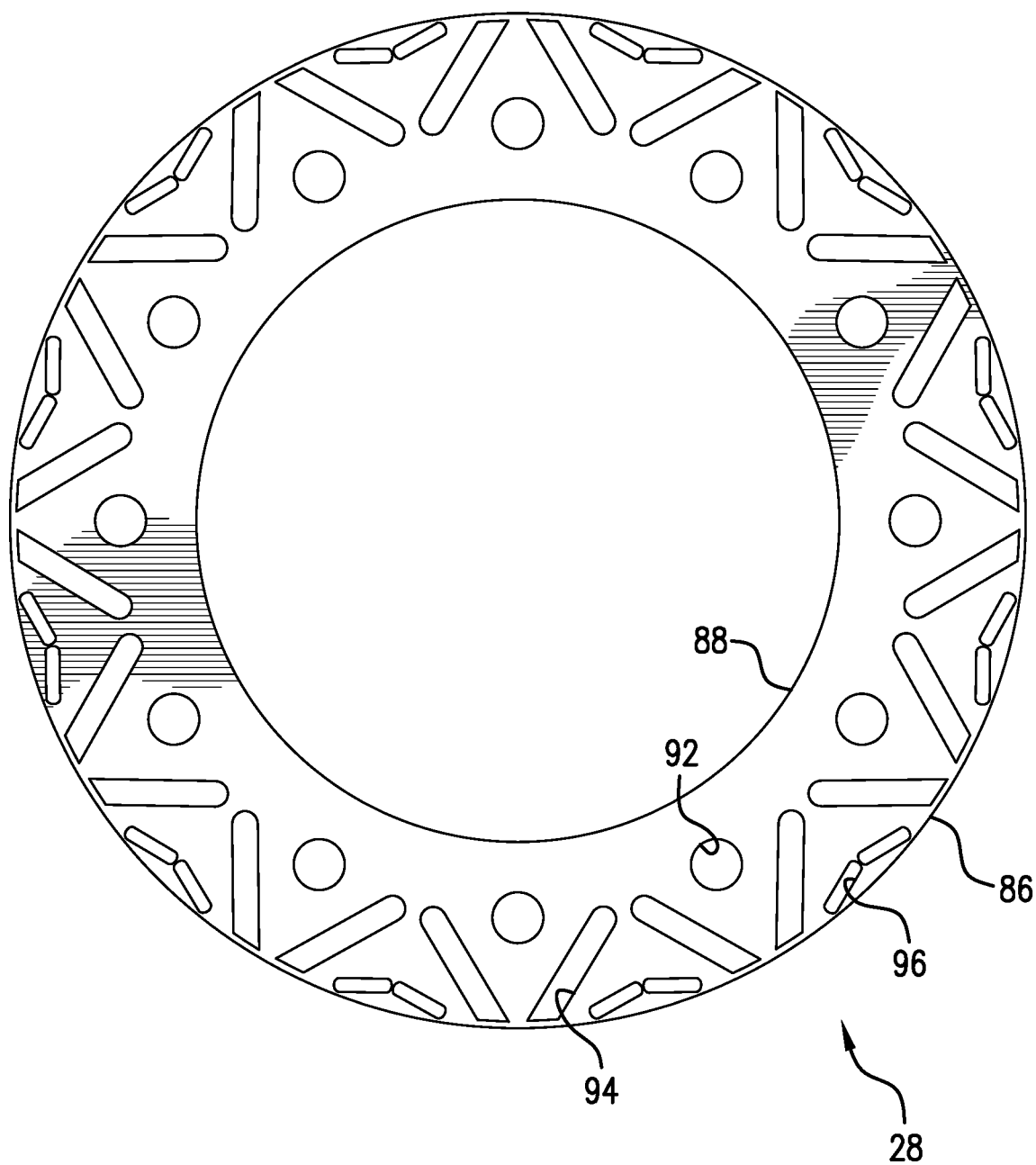
FIG. 4 depicts a plan view of another rotor lamination of the rotor of FIG. 1.
Figure 5:
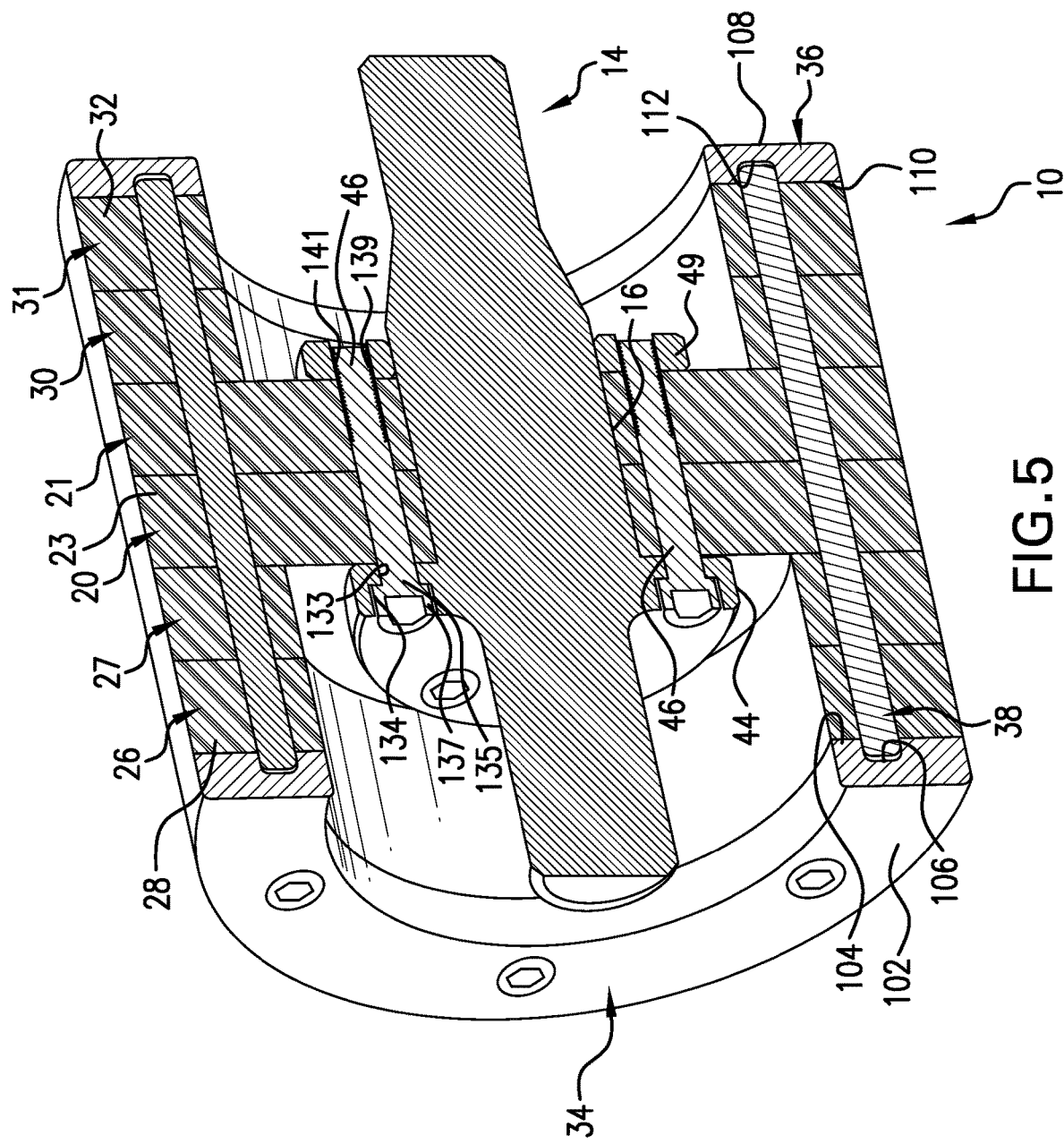
FIG. 5 depicts a cross-sectional perspective view of the rotor of FIG. 1 taken along the line 5-5, in accordance with an aspect of an exemplary embodiment.
Figure 6:
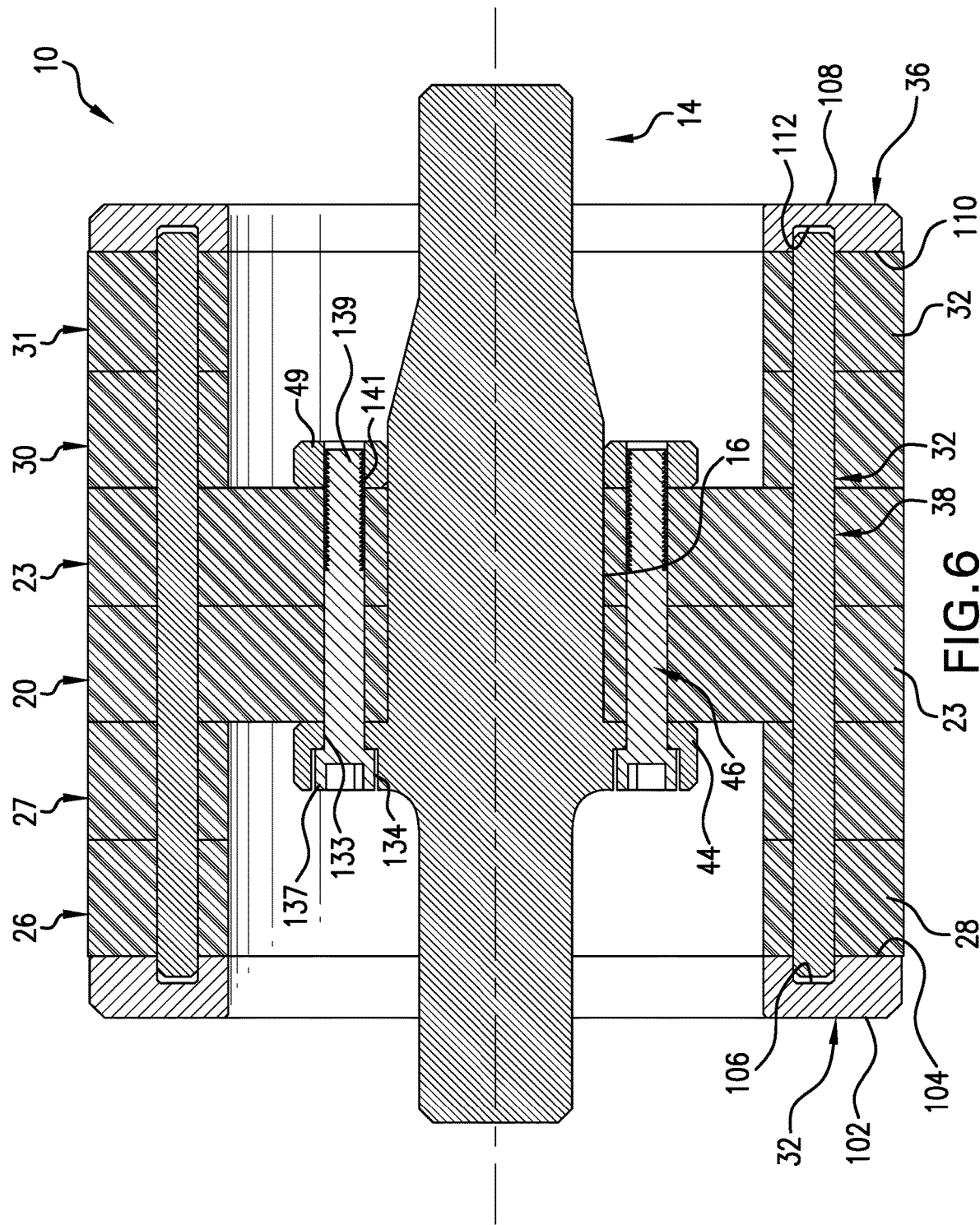
FIG. 6 depicts a cross-sectional side view of the rotor of FIG. 1 taken along the line 5-5, in accordance with an aspect of an exemplary embodiment.

Reference will now follow to FIG. 4 in describing second plurality of laminations 28. It should be understood that the third plurality of laminations 32 include similar structure. Each of the second plurality of laminations 28 includes an outer surface portion 86 and an inner surface portion 88 having a third diameter. In accordance with an exemplary aspect, the third diameter is greater than the first diameter and the second diameter. In further accordance with an exemplary aspect, the third diameter is at least double the first diameter and the second diameter. Each of the second plurality of laminations 28 also includes a plurality of openings 92 which receive corresponding ones of fasteners 40; magnet receiving openings 94 that align with magnet receiving openings 74; and cooling passages 96 that align with cooling passages 78.

Reference will now follow to FIGS. 5-8 in describing aspects of rotor First end cap 34 includes a first or outer surface 102 and a second or inner surface 104 that faces first outer lamination stack 26. Second surface 104 includes a plurality of recesses 106 that receive end portions (not separately labeled) of corresponding ones of the plurality of alignment pins 38. Similarly, second end cap 36 includes a first or outer surface portion 108 and a second or inner surface portion 110 that faces fourth outer lamination stack 31. Second surface portion 110 includes a plurality of recesses 112 that receive opposing end portions (also not separately labeled) of corresponding ones of the plurality of alignment pins 38.

Figure 7:
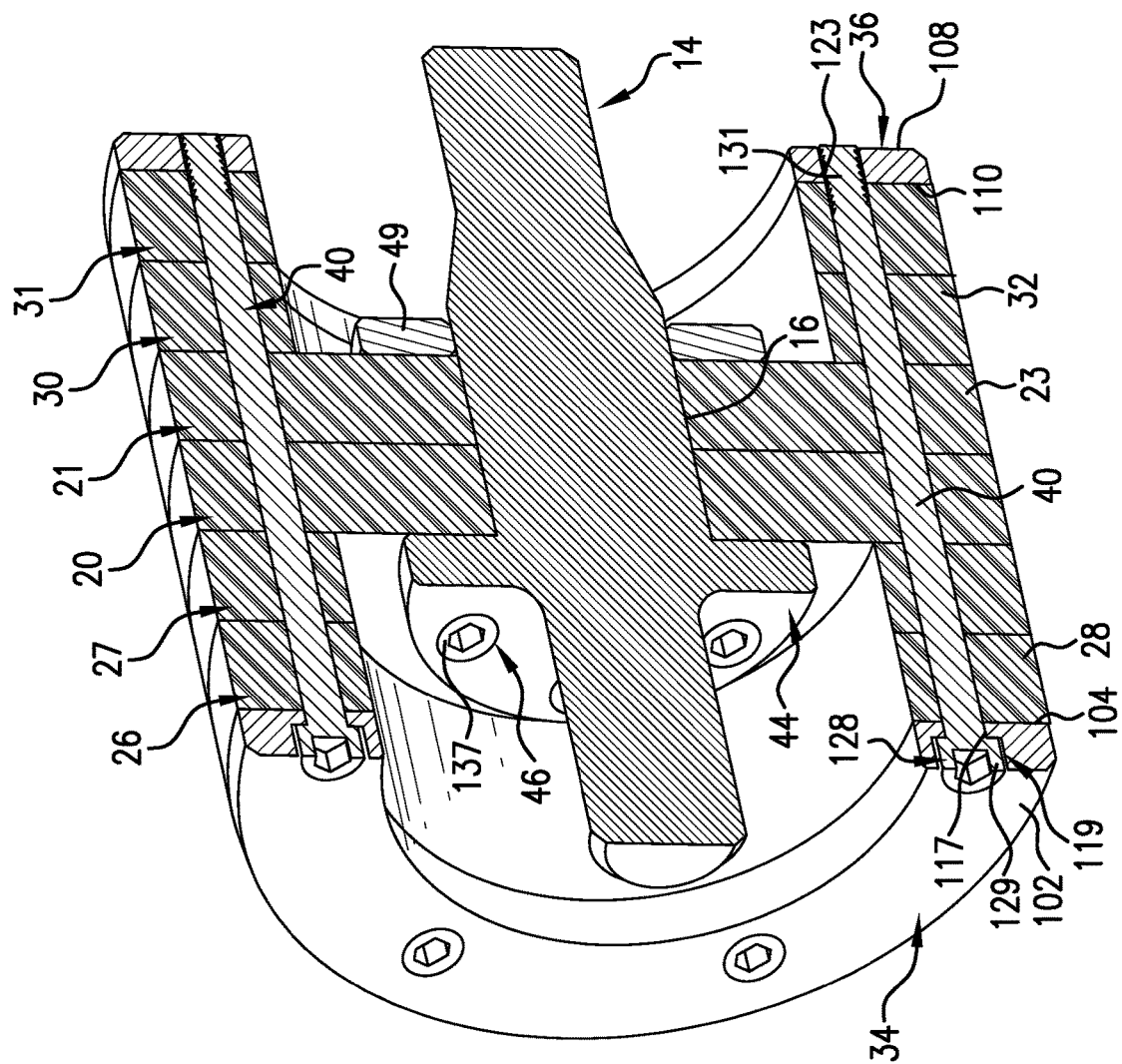
FIG. 7 depicts a cross-sectional perspective view of the rotor of FIG. 1 taken along the line 7-7, in accordance with an aspect of an exemplary embodiment.
Figure 8:
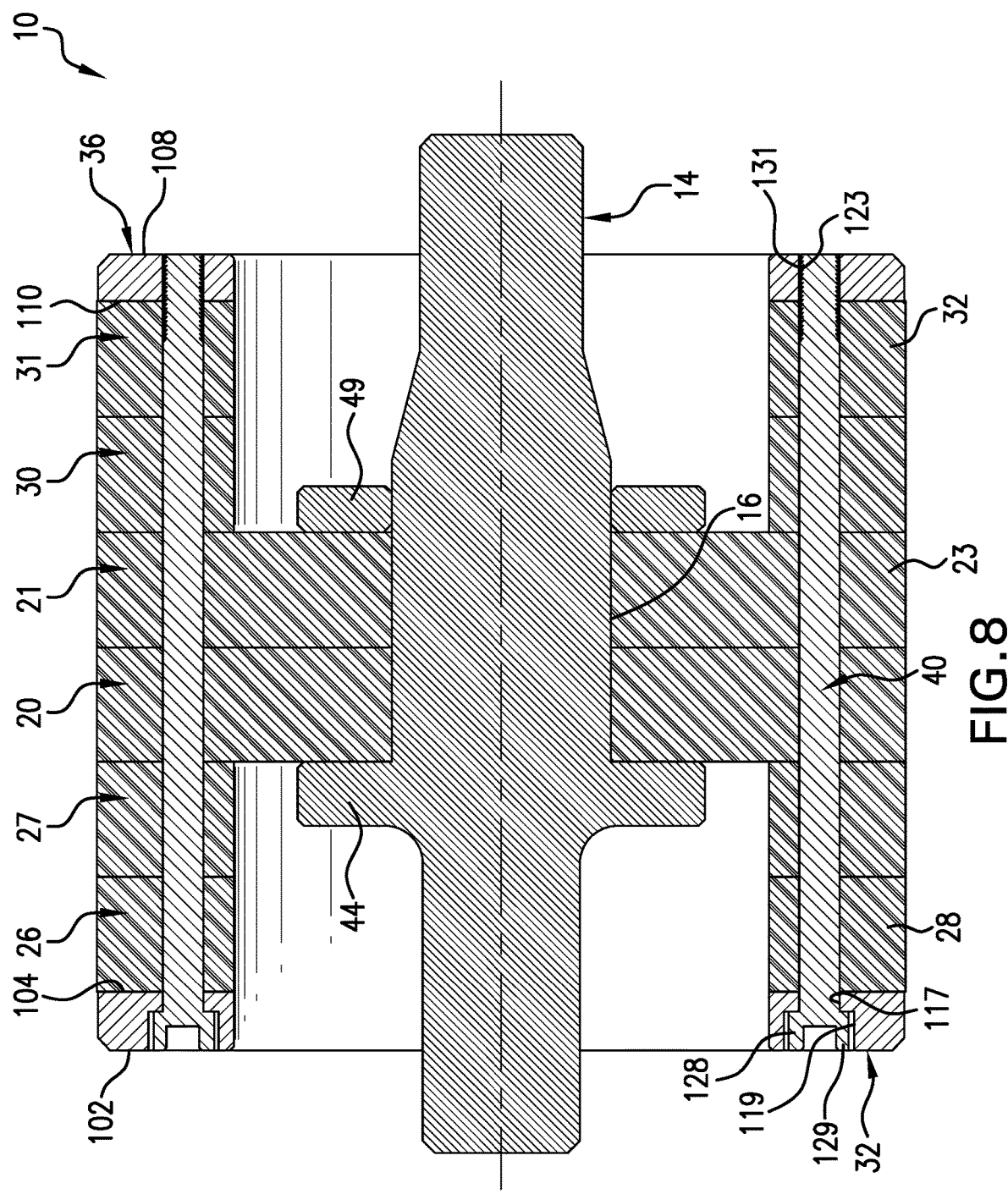
FIG. 8 depicts a cross-sectional side view of the rotor of FIG. 1 taken along the line 7-7, in accordance with an aspect of an exemplary embodiment.

First end cap 34, as shown in FIG. 7, also includes a plurality of passages 117 that extend from first surface 102 through second surface 104. A plurality of recessed portions 119 are provided in first surface at each of the plurality of passages 117. Second end cap 36 includes a plurality of threaded passages 123. Each of the plurality of fasteners 40 includes a head end 128 including a cap 129 that nests within recessed portion 119 and a threaded end 131 that engages with threaded passages 123. In this manner, fasteners 40 may be tightened to a selected torque to join the first outer lamination stack 26, the second outer lamination stack 27, the first central lamination stack 20, the second central lamination stack 21, the third outer lamination stack 26 and the fourth outer lamination stack 27.

In an exemplary aspect, flange 44 includes a plurality of holes 133 each of which includes a corresponding recess 134. Holes 133 receive a corresponding one of fasteners 46. That is, each fastener 46 includes a head end section 135 having a cap 137 that nests within recess 134 and a threaded end 139 that engages threaded openings 141 or holes provided in support member 49. With this arrangement, fasteners 46 are tightened to a selected torque value to join first and second central laminations 20 and 21 to flange 44. Thus, in an embodiment, fasteners 40 and fasteners 46 take the form of threaded fasteners or bolts. It should however, be understood that fasteners 40 and fasteners 46 may take on various forms including rivets and the like.

Figure 9:
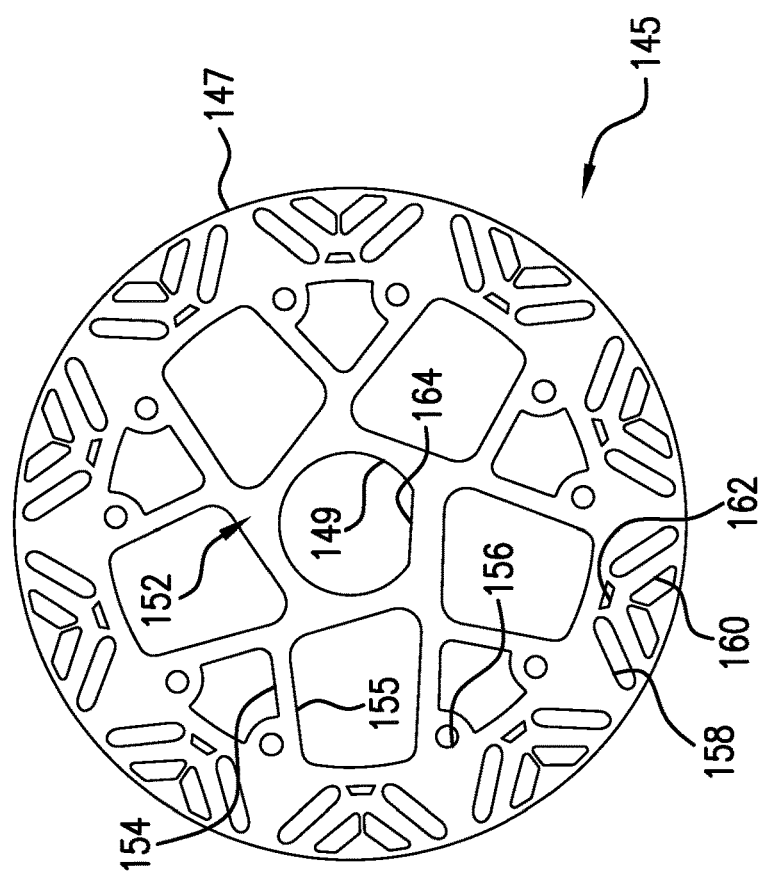
FIG. 9 depicts a plan view of a rotor lamination, in accordance with another aspect of an exemplary embodiment.

Reference will now follow to FIG. 9 in describing a first plurality of lamination 145 in accordance with another exemplary aspect. First plurality of laminations 145 includes an outer annular surface 147 and an inner surface 149 having the second diameter. First plurality of laminations 145 include a web 152 including a plurality of spokes 154 defined by a plurality of voids 155. The size, location, and shape of voids 155 may vary. First plurality of laminations 145 also includes fastener openings 156, magnet receiving openings 158, magnet receiving openings 160, and cooling passages 162. Inner surface 149 may include a flat zone 164. Flat zone 164 establishes a desired orientation of first plurality of laminations 145 on shaft 14 without the need for alignment pins.

Figure 10:
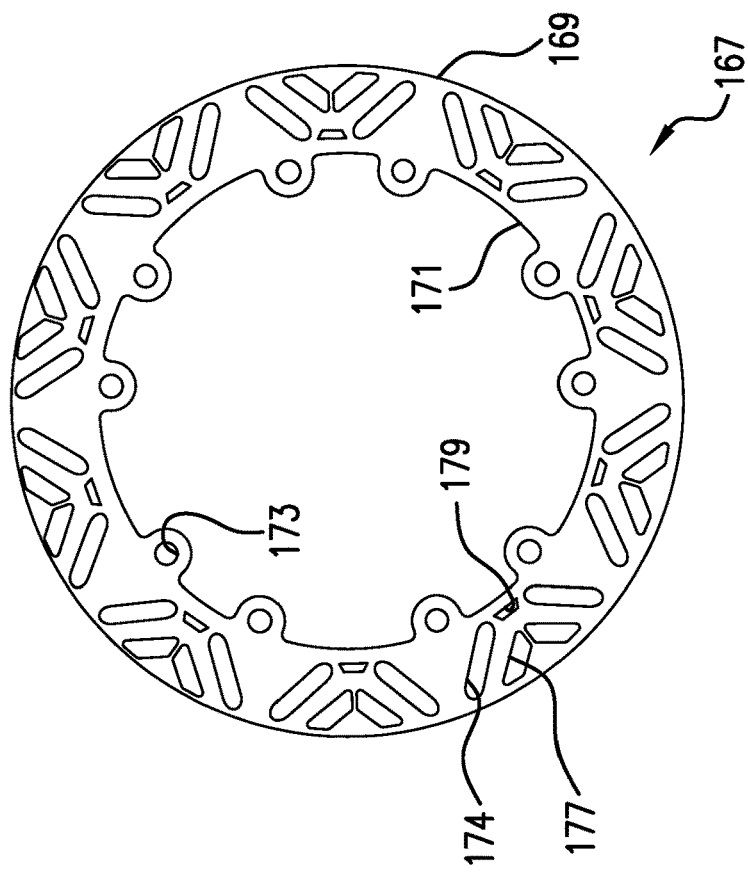
FIG. 10 depicts a plan view of another rotor lamination, in accordance with another aspect of an exemplary embodiment.

Reference will now follow to FIG. 10 in describing a second plurality of laminations 167 in accordance with another exemplary aspect. Second plurality of laminations 167 includes an outer annular surface portion 169 and an inner surface portion 171 having the third diameter. Second plurality of laminations 167 includes a plurality of fastener openings 173, a plurality of magnet openings 174, another plurality of magnet openings 177, and a plurality of cooling passages 179. Plurality of fastener openings 173 register with fastener openings 156 on first plurality of laminations 145 and are arranged to establish the selected orientation. Fastener openings 156 and fastener opening 173 may receive fasteners (not shown) that could take the form of rivets.

At this point, it should be understood that the exemplary embodiments describe a rotor for an electric machine that is devoid of a central hub which supports all laminations. Eliminating the central hub reduces weight, manufacturing time, and simplifies manufacturing steps.

The terms "about" and "substantially" are intended to include the degree of error associated with measurement of the particular quantity based upon the equipment available at the time of filing the application. For example, "about" or "substantially" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A rotor comprising:
a shaft having an outer surface including a first diameter and a flange extending from the outer surface;
a first plurality of laminations arranged about the shaft, the first plurality of laminations including an outer annular surface and an inner surface defining an opening including a second diameter that is substantially equal to the first diameter;
a first plurality of fasteners that extend through the flange and the first plurality of laminations;
a support member arranged at the first plurality of laminations, wherein the first plurality of fasteners extend through the flange, the first plurality of laminations and into the support member;
a second plurality of laminations arranged about the shaft and coupled to the first plurality of laminations, the second plurality of laminations including an outer annular surface portion and an inner surface portion defining a third diameter that is greater than the first diameter, the second plurality of laminations being arranged axially outwardly of the first plurality of laminations in a first direction; and
a third plurality of laminations arranged about the shaft and coupled to the first plurality of laminations axially outwardly of the first plurality of laminations in a second direction that is opposite the first direction.

2. The rotor according to claim 1, wherein the first plurality of fasteners are threaded into the support member.

3. The rotor according to claim 1, wherein the first plurality of fasteners do not pass through any portions of the second plurality of laminations.

4. The rotor according to claim 1, further comprising: a second plurality of fasteners extending through the first plurality of laminations and the second plurality of laminations.

5. The rotor according to claim 4, wherein the second plurality of fasteners do not extend through the flange.

6. The rotor according to claim 1, wherein the third diameter is greater than the second diameter.

7. The rotor according to claim 1, wherein the first plurality of laminations form a central lamination stack and the second plurality of laminations form a first outer lamination stack arranged axially outwardly of a first surface of the central lamination stack.

8. The rotor according to claim 7, further comprising: a second outer lamination stack arranged axially outwardly of a second, opposing surface of the central lamination stack, the second outer lamination stack being formed from the third plurality of laminations.

9. The rotor according to claim 8, further comprising: a first end cap arranged at the first outer lamination stack formed from the second plurality of laminations and a second end cap arranged at the second outer lamination stack formed from the third plurality of laminations.

10. The rotor according to claim 9, further comprising: a plurality of fasteners extending through the first end cap, the first outer lamination stack, the central lamination stack, and the second outer lamination stack into the second end cap.

11. The rotor according to claim 10, wherein the plurality of fasteners are threaded into the second end cap.

12. The rotor according to claim 9, further comprising: a plurality of alignment pins extending through the first outer lamination stack, the central lamination stack, and the second outer lamination stack into the second end cap.

13. The rotor according to claim 12, wherein the first end cap includes a first plurality of recesses receptive of a first end portion of each of the plurality of alignment pins and the second end cap includes a plurality of recesses receptive of a second end portion of each of the plurality of alignment pins.

14. The rotor according to claim 1, wherein each of the first plurality of laminations includes a web that extends from the outer annular surface to the inner surface.

15. The rotor according to claim 14, wherein the web is substantially continuous.

16. The rotor according to claim 15, wherein the web includes a plurality of spokes.

17. The rotor according to claim 1, wherein the third diameter is at least double the first diameter.

18. The rotor according to claim 1, wherein the second plurality of laminations do not abut the shaft.

* * * * *